United States Patent
Koponen et al.

(10) Patent No.: US 9,815,731 B1
(45) Date of Patent: Nov. 14, 2017

(54) TAPERED CORE FIBER MANUFACTURING METHODS

(71) Applicant: nLIGHT, Inc., Vancouver, WA (US)

(72) Inventors: Joona Koponen, Vantaa (FI); Laeticia Petit, Lohja (FI); Petteri Väinänen, Lohja (FI)

(73) Assignee: nLIGHT, Inc., Vancouver, WA (US)

( * ) Notice: Subject to any disclaimer, the term of this patent is extended or adjusted under 35 U.S.C. 154(b) by 0 days.

(21) Appl. No.: 15/299,327

(22) Filed: Oct. 20, 2016

Related U.S. Application Data

(63) Continuation of application No. 13/494,768, filed on Jun. 12, 2012, now Pat. No. 9,484,706.

(51) Int. Cl.
  *G02B 6/02* (2006.01)
  *C03B 37/023* (2006.01)
  *C03B 37/025* (2006.01)
  *H01S 3/067* (2006.01)

(52) U.S. Cl.
  CPC ...... *C03B 37/0253* (2013.01); *H01S 3/06745* (2013.01); *C03B 2203/10* (2013.01); *C03B 2205/08* (2013.01); *C03B 2205/13* (2013.01); *C03B 2205/44* (2013.01)

(58) Field of Classification Search
  CPC ....... G02B 6/02; H01S 3/067; H01S 3/06708; H01S 3/06745; C03B 37/0253; C03B 2203/10; C03B 2205/08; C03B 2205/13; C03B 2205/44
  USPC ............................ 385/123, 126, 127; 65/385
  See application file for complete search history.

(56) References Cited

U.S. PATENT DOCUMENTS

| | | | |
|---|---|---|---|
| 3,037,241 A * | 6/1962 | Bazinet, Jr. | ....... C03B 37/01211 65/412 |
| 3,505,046 A | 4/1970 | Phaneuf | |
| 3,909,110 A | 9/1975 | Marcuse | |
| 4,046,537 A | 9/1977 | Deserno et al. | |
| 4,049,413 A | 9/1977 | French | |
| 4,072,399 A | 2/1978 | Love | |
| 4,179,185 A | 12/1979 | Hawk | |
| 4,773,924 A | 9/1988 | Berkey | |
| 4,818,062 A | 4/1989 | Scifres et al. | |
| 5,011,251 A | 4/1991 | Miller et al. | |
| 5,017,206 A | 5/1991 | Miller et al. | |

(Continued)

FOREIGN PATENT DOCUMENTS

| | | |
|---|---|---|
| EP | 1116697 | 7/2001 |
| RU | 2176840 C2 | 12/2001 |

(Continued)

OTHER PUBLICATIONS

Geshiro et al., "Truncated parabolic-index fiber with minimum mode dispersion," *IEEE Trans. on Microw. Theory Techn.*, 26:115-119 (1978).

(Continued)

*Primary Examiner* — Robert Tavlykaev
(74) *Attorney, Agent, or Firm* — Klarquist Sparkman, LLP

(57) ABSTRACT

Tapered core fibers are produced using tapered core rods that can be etched or ground so that a fiber cladding has a constant diameter. The tapered core can be an actively doped core, or a passive core. One or more sleeving tubes can be collapsed onto a tapered core rod and exterior portions of the collapsed sleeving tubes can be ground to provide a constant cladding diameter in a fiber drawn from the preform.

10 Claims, 5 Drawing Sheets

(56) References Cited

U.S. PATENT DOCUMENTS

| | | | |
|---|---|---|---|
| 5,153,932 A | 10/1992 | Blyler, Jr. et al. |
| 5,239,176 A | 8/1993 | Stevenson |
| 5,259,046 A | 11/1993 | DiGiovanni et al. |
| 5,295,210 A | 3/1994 | Nolan et al. |
| 5,295,211 A | 3/1994 | Weidman |
| 5,395,741 A | 3/1995 | Marchman |
| 5,408,554 A | 4/1995 | Cryan et al. |
| 5,448,673 A | 9/1995 | Murphy et al. |
| 5,461,692 A | 10/1995 | Nagel |
| 5,568,318 A | 10/1996 | Leger et al. |
| 5,579,422 A | 11/1996 | Head et al. |
| 5,629,997 A | 5/1997 | Hardy |
| 5,664,037 A | 9/1997 | Weidman |
| 5,668,903 A | 9/1997 | Neuberger et al. |
| 5,715,270 A | 2/1998 | Zediker |
| 5,729,643 A | 3/1998 | Hmelar et al. |
| 5,734,766 A | 3/1998 | Flint |
| 5,745,284 A | 4/1998 | Goldberg et al. |
| 5,818,630 A | 10/1998 | Fermann et al. |
| 5,825,803 A | 10/1998 | Labranche |
| 5,864,644 A | 1/1999 | DiGiovanni et al. |
| 5,867,305 A | 2/1999 | Waarts et al. |
| 5,873,923 A | 2/1999 | DiGiovanni |
| 5,887,097 A | 3/1999 | Henry et al. |
| 5,935,288 A | 8/1999 | DiGiovanni et al. |
| 5,949,932 A | 9/1999 | Lawrenz-Stolz |
| 6,031,953 A | 2/2000 | Rekow et al. |
| 6,044,096 A | 3/2000 | Wolak et al. |
| 6,044,191 A | 3/2000 | Berkey et al. |
| 6,053,013 A * | 4/2000 | Oh ................ C03B 23/043 65/377 |
| 6,078,716 A | 6/2000 | Huang et al. |
| 6,101,199 A | 8/2000 | Wang et al. |
| 6,134,362 A | 10/2000 | Au-Yeung et al. |
| 6,198,858 B1 | 3/2001 | Pan et al. |
| 6,272,268 B1 | 8/2001 | Miller et al. |
| 6,275,512 B1 | 8/2001 | Fermann |
| 6,278,816 B1 | 8/2001 | Keur et al. |
| 6,292,608 B1 | 9/2001 | Toh |
| 6,301,934 B1 | 10/2001 | Dobbins |
| 6,347,174 B1 | 2/2002 | Onishi et al. |
| 6,373,868 B1 | 4/2002 | Zhang |
| 6,385,371 B1 | 5/2002 | Li |
| 6,389,207 B1 | 5/2002 | Berkey |
| 6,397,636 B1 | 6/2002 | DiGiovanni et al. |
| 6,404,954 B1 | 6/2002 | Zhu et al. |
| 6,404,964 B1 | 6/2002 | Bhagavatula et al. |
| 6,421,489 B1 | 7/2002 | Berkey et al. |
| 6,434,295 B1 | 8/2002 | MacCormack et al. |
| 6,434,302 B1 | 8/2002 | Fidric et al. |
| 6,477,295 B1 | 11/2002 | Lang et al. |
| 6,496,301 B1 | 12/2002 | Koplow et al. |
| 6,502,428 B1 * | 1/2003 | Onishi ............... C03B 37/0253 65/378 |
| 6,516,124 B2 | 2/2003 | Po |
| 6,519,974 B1 * | 2/2003 | Oh ................ C03B 37/0253 65/379 |
| 6,532,244 B1 | 3/2003 | Dewey et al. |
| 6,534,741 B2 | 3/2003 | Presby |
| 6,539,154 B1 | 3/2003 | Berkey et al. |
| 6,608,951 B1 | 8/2003 | Goldberg et al. |
| 6,666,590 B2 | 12/2003 | Brosnan |
| 6,668,112 B1 | 12/2003 | Kaneda |
| 6,700,709 B1 | 3/2004 | Fermann |
| 6,731,837 B2 | 5/2004 | Goldberg et al. |
| 6,778,732 B1 | 8/2004 | Fermann |
| 6,816,652 B1 | 11/2004 | Lin et al. |
| 6,868,236 B2 | 3/2005 | Wiltsey et al. |
| 6,907,163 B2 | 6/2005 | Lewis |
| 6,956,876 B1 | 10/2005 | Aquaro et al. |
| 6,970,624 B2 | 11/2005 | DiGiovanni et al. |
| 6,990,278 B2 | 1/2006 | Vakili et al. |
| 7,016,573 B2 | 3/2006 | Dong et al. |
| 7,046,432 B2 | 5/2006 | Starodoumov |
| 7,046,875 B2 | 5/2006 | Gonthier et al. |
| 7,085,040 B2 | 8/2006 | Okuno et al. |
| 7,184,623 B2 | 2/2007 | Cai et al. |
| 7,209,615 B2 | 4/2007 | Fishteyn |
| 7,221,822 B2 | 5/2007 | Grudinin et al. |
| 7,236,671 B2 | 6/2007 | Rasmussen |
| 7,272,956 B1 | 9/2007 | Anikitchev et al. |
| 7,327,920 B2 | 2/2008 | Dong et al. |
| 7,336,872 B1 | 2/2008 | Malo |
| 7,420,996 B2 | 9/2008 | Schulte et al. |
| 7,436,868 B2 | 10/2008 | Schulte et al. |
| 7,437,046 B2 | 10/2008 | DiGiovanni et al. |
| 7,443,895 B2 | 10/2008 | Schulte et al. |
| 7,526,165 B2 | 4/2009 | Nielsen et al. |
| 7,532,792 B2 | 5/2009 | Skovaard et al. |
| 7,539,377 B2 | 5/2009 | Gonthier |
| 7,561,769 B2 | 7/2009 | Fujimoto et al. |
| 7,574,087 B2 | 8/2009 | Inoue et al. |
| 7,586,963 B2 | 9/2009 | Schulte et al. |
| 7,606,452 B2 | 10/2009 | Bilodeau et al. |
| 7,637,126 B2 | 12/2009 | Koeppler et al. |
| 7,729,574 B2 | 6/2010 | Moriarty |
| 7,760,978 B2 | 7/2010 | DiGiovanni et al. |
| 7,787,733 B2 | 8/2010 | DiGiovanni et al. |
| 7,957,432 B2 | 6/2011 | Seo et al. |
| 7,991,255 B2 | 8/2011 | Salokative |
| 8,068,705 B2 | 11/2011 | Gapontsev et al. |
| 8,213,070 B2 | 7/2012 | Koplow |
| 8,248,688 B2 | 8/2012 | Baird et al. |
| 8,346,038 B2 | 1/2013 | Gonthier |
| 8,433,168 B2 | 4/2013 | Filippov et al. |
| RE44,262 E | 6/2013 | Gonthier et al. |
| 8,457,456 B2 | 6/2013 | Kopp et al. |
| 8,472,765 B2 | 6/2013 | Holland |
| 8,483,533 B1 | 7/2013 | Mehl |
| 8,498,046 B2 | 7/2013 | Dong et al. |
| 8,711,471 B2 | 4/2014 | Liu et al. |
| 9,071,033 B2 | 6/2015 | Clowes |
| 9,484,706 B1 | 11/2016 | Koponen et al. |
| 2001/0003911 A1 * | 6/2001 | Okuno ............... C03B 37/0253 65/435 |
| 2001/0038740 A1 * | 11/2001 | Hasegawa ............... B82Y 20/00 385/123 |
| 2002/0172486 A1 | 11/2002 | Fermann |
| 2003/0031442 A1 | 2/2003 | Siegman |
| 2004/0194512 A1 * | 10/2004 | Hong ................ C03B 37/027 65/402 |
| 2004/0196537 A1 | 10/2004 | Starodoumov |
| 2004/0228593 A1 | 11/2004 | Sun et al. |
| 2005/0008044 A1 | 1/2005 | Fermann et al. |
| 2005/0041702 A1 | 2/2005 | Fermann et al. |
| 2005/0226286 A1 | 10/2005 | Liu et al. |
| 2005/0265653 A1 | 12/2005 | Cai et al. |
| 2005/0265678 A1 | 12/2005 | Manyam et al. |
| 2007/0062222 A1 | 3/2007 | Janka et al. |
| 2007/0086501 A1 | 4/2007 | Karlsen |
| 2007/0116071 A1 | 5/2007 | Schulte et al. |
| 2007/0116077 A1 | 5/2007 | Farmer et al. |
| 2007/0196062 A1 | 8/2007 | Inoue et al. |
| 2007/0237453 A1 | 10/2007 | Nielsen et al. |
| 2008/0050069 A1 | 2/2008 | Skovaard et al. |
| 2008/0063348 A1 | 3/2008 | Kumano et al. |
| 2008/0166094 A1 | 7/2008 | Bookbinder et al. |
| 2008/0170823 A1 | 7/2008 | Gonthier |
| 2008/0267229 A1 | 10/2008 | Kojima |
| 2009/0003788 A1 | 1/2009 | Galvanauskas |
| 2009/0010286 A1 | 1/2009 | Messaddeq et al. |
| 2009/0060417 A1 | 3/2009 | Bilodeau et al. |
| 2009/0092365 A1 | 4/2009 | Donlagic |
| 2009/0136176 A1 | 5/2009 | Kopp et al. |
| 2009/0202204 A1 | 8/2009 | Nielsen et al. |
| 2009/0320526 A1 | 12/2009 | Carberry et al. |
| 2010/0111118 A1 | 5/2010 | Seo et al. |
| 2010/0142894 A1 | 6/2010 | Gonthier |
| 2010/0247047 A1 | 9/2010 | Filippov et al. |
| 2010/0278486 A1 | 11/2010 | Holland |
| 2011/0032602 A1 | 2/2011 | Rothenberg |
| 2011/0032603 A1 | 2/2011 | Rothenberg |
| 2011/0032604 A1 | 2/2011 | Rothenberg et al. |
| 2011/0058250 A1 | 3/2011 | Liu et al. |

(56) References Cited

U.S. PATENT DOCUMENTS

| | | |
|---|---|---|
| 2011/0069723 A1 | 3/2011 | Dong et al. |
| 2011/0100063 A1 | 5/2011 | Desorcie et al. |
| 2011/0100066 A1 | 5/2011 | Bohme et al. |
| 2011/0157671 A1 | 6/2011 | Koplow |
| 2011/0305250 A1 | 12/2011 | Chann et al. |
| 2012/0032087 A1 | 2/2012 | Sugihara |
| 2012/0127563 A1 | 5/2012 | Farmer et al. |
| 2012/0219026 A1 | 8/2012 | Saracco et al. |
| 2012/0230352 A1 | 9/2012 | Minelly et al. |
| 2012/0262781 A1 | 10/2012 | Price et al. |
| 2013/0182999 A1* | 7/2013 | Jacobsen ............ G02B 6/02376 385/43 |
| 2013/0287338 A1 | 10/2013 | Majid et al. |
| 2014/0119694 A1 | 5/2014 | Abedin et al. |

FOREIGN PATENT DOCUMENTS

| | | |
|---|---|---|
| WO | WO 92/10014 | 6/1992 |
| WO | WO 97/42533 | 11/1997 |
| WO | WO 2005/022705 | 3/2005 |
| WO | WO 2009/043968 | 4/2009 |
| WO | WO 2011/066440 | 6/2011 |
| WO | WO 2013/102033 | 7/2013 |

OTHER PUBLICATIONS

Geshiro et al., "Analysis of wave modes in slab waveguide with truncated parabolic index," *IEEE J. Quantum Electron.*, 10:647-649 (1974).

nLIGHT Corporation, "nLIGHT Introduces New Line of All Fiber Mode Field Tapers" Jan. 23, 2009 News Release, http://nlight.net/new/releases/92~nLIGHT-Introduces-New-Line-of-All-Fiber-Mode-Field, downloaded Jan. 18, 2014.

nLIGHT, spreadsheet listing order dates for tapers.

Niels Asger Mortensen, "Air-clad fibers: pump absorption assisted by chaotic wave dynamics?," *Optics Express*, 15:8988-8996 (Jul. 5, 2007).

Eidam et al., "Femtosecond fiber CPA system emitting 830 W average output power," Opt. Lett. 35, 94-96 (2010).

Russbueldt et al., "400 W Yb:YAG Innoslab fs-amplifier," Opt. Express 17, 12230-12245 (2009).

Stolzenburg et al., "Picosecond Regenerative Yb:YAG Thin Disk Amplifier at 200 kHz Repetition Rate and 62 W Output Power," in *Advanced Solid-State Photonics*, OSA Technical Digest Series (CD) (Optical Society of America, 2007), paper MA6 (3 pgs.).

International Search Report from PCT Application No. PCT/US2012/072003, dated Mar. 27, 2013, 2 pp.

Written opinion from PCT Application No. PCT/US2012/072003, dated Apr. 4, 2013, 3 pp.

International Search Report from International Application No. PCT/US2013/030569, dated Jul. 4, 2013, 3 pp.

Written Opinion from International Application No. PCT/US2013/030569, dated Jul. 4, 2013, 5 pp.

Jauregui et al., "All-Fiber Side Pump Combiner for High Power Fiber Lasers and Amplifiers," Proc. of SPIE, 7580:75801E-1-75801E-8 (2010).

"Pump and Signal Taper for Airclad Fibers Final Report," Air Force Research Laboratory, 8 pages (May 1, 2006).

International Search Report from PCT Publication No. PCT/US2013/077242, 2pp. (dated May 22, 2014).

International Search Report from PCT Publication No. PCT/US2013/077243, 2pp. (dated Apr. 17, 2014).

Written Opinion from PCT Publication No. PCT/US2013/077242, 4pp. (dated May 22, 2014).

Written Opinion from PCT Publication No. PCT/US2013/077243, 4pp. (dated Apr. 17, 2014).

\* cited by examiner

TAPERED CORE FIBER MANUFACTURING METHODS

CROSS REFERENCE TO RELATED APPLICATION

This application is a continuation of U.S. patent application Ser. No. 13/494,768, filed on Jun. 12, 2012, which is incorporated herein by reference.

FIELD

The disclosure pertains to optical fibers with tapered cores.

BACKGROUND

Optical fibers are generally fabricated so as to have substantially constant core and cladding diameters. These constant diameters result in low propagation losses, and permit relatively straightforward connecterization of fiber cables and fiber splicing. However, tapered fibers can be useful as well. For example, a tapered fiber can be used to suppress higher order modes, or to expand a mode field diameter to improve mode matching between different fibers. Tapering a fiber is typically based on a drawing process so that a fiber core and cladding are tapered in the same manner, and a ratio of core and cladding diameters is unchanged by tapering. Some applications of fiber technology can be better addressed with independent control of fiber core and cladding diameters.

SUMMARY

Disclosed herein are representative optical fibers, fiber preforms, and associated methods that can provide fibers with tapered cores and constant diameter claddings. In some examples, an optical fiber comprises a tapered core that extends along a propagation axis. An inner cladding surrounds the core and extends along the propagation axis, wherein the tapered core and the inner cladding have respective cross-sectional areas $A_{CORE}$, $A_{INNER}$, and a ratio $A_{CORE}/A_{INNER}$ varies along the propagation axis. In typical examples, the inner cladding has a constant cross-sectional area and the tapered core defines a few mode optical fiber. In some examples, the core is doped with a rare earth element. In other embodiments, an outer cladding surrounds the inner cladding, wherein the inner cladding and the core are configured to guide optical radiation. In some examples, the tapered core and the inner cladding have circular cross-sectional areas. In representative examples, at least a portion of the tapered core defines a single mode waveguide and a radius of the core varies linearly along the propagation axis. In other examples, a core radius varies periodically or quasi-periodically along the propagation axis. In convenient examples, the core is centered with respect to the inner cladding.

Fiber preforms typically comprise concentric cylinders or layers of materials suitable for forming optical waveguides. A central cylinder can serve to define a waveguide core, and layers exterior to the central cylinder can serve to define waveguide cladding layers with generally lower refractive indices than that of the central core-forming portion. In many preform manufacturing methods, one or multiple sleeving processes take place, in which one or more glass tubes are collapsed onto a glass rod, glass tube, or a stack of glass rods and/or tubes. As used herein, a core rod is defined as a core waveguide material shaped so as to be suitable for forming into a waveguide core, and may include one or more surrounding cladding materials.

Tapered fiber preforms comprise a tapered core rod, and at least one sleeving tube is situated about the core rod and collapsed toward the tapered core rod. In some examples, a plurality of silica grains is situated between the tapered core rod and an interior surface of the at least one sleeving tube. In still other examples, a plurality of sleeving tubes is situated about the core rod and collapsed toward the tapered core rod. In some embodiments, the at least one sleeving tube includes a plurality of indentations or protrusions at an exterior or interior surface. In some examples, the tapers of the tapered core rod include a plurality of neck regions, and the protrusions of the sleeving tube are situated at respective neck regions. In further embodiments, the sleeving tube includes a plurality of apertures in a wall of the sleeving tube. In other examples, the sleeving tube comprises a first section and a second section situated to provide a gap between the first section and the second section.

Methods comprise providing a core rod and collapsing an inner sleeving tube onto the core rod. The sleeved core rod is then tapered by machining, etching, or drawing. In some representative examples, at least one outer sleeving tube is collapsed onto the sleeved, tapered core rod. The outer sleeved tapered core rod is processed to provide a constant cross-sectional area or a constant diameter. Typically, processing includes at least one of etching or machining the outer sleeving tube.

In other examples, methods include situating a tapered core rod in a cladding tube and depositing silica grains in the cladding tube. The silica grains and the cladding tube are fused to the tapered core rod to form a fused fiber preform. In some examples, the fused fiber preform is drawn so as to produce an optical fiber. In typical examples, the fused fiber preform is drawn so as to produce a fiber with a constant cladding diameter. In other representative embodiments, a vacuum is applied to the silica grains prior to or during fusing. The tapered core rod can be an actively doped core rod or an undoped core rod.

Additional methods comprise situating a glass structure including the core within a cladding tube and applying a modulated feed rate difference between the structure containing the core and the cladding tube. The core structure and the cladding tube are drawn to form an optical fiber, wherein at least one of a fiber core diameter and a fiber cladding diameter is at least partially determined by the feed rate difference. In particular examples, the feed rate difference is selected so that the structure including the core and cladding is drawn so that the optical fiber has a tapered core. Typically, a time-varying feed rate is applied. In some embodiments, at least one capillary tube is situated within the cladding tube, and the core structure, the capillary tube, and the cladding tube are drawn to produce the optical fiber. In further examples, the cladding tube interior is at least partially filled with silica grains, and the silica grains are fused as the core tube, the capillary tube, and the cladding tube are drawn to form the optical fiber.

Other methods comprise situating a core rod having a tapered core in a cladding tube, and drawing the core rod and the cladding tube so as to form an optical fiber. In some examples, the tapered core is doped with an active dopant. In further embodiments, the core rod and the cladding tube are drawn so that the optical fiber has a constant cladding diameter. In still other examples, the core rod has a constant outside diameter.

Methods of producing a fiber comprise situating a core tube within a sleeving tube and drawing the core tube and the sleeving tube such that the core tube and the sleeving tube have a feed rate difference. In some examples, the feed rate difference is selected to produce a tapered core fiber, a tapered core fiber and a constant cladding diameter, or a tapered cladding exterior.

The foregoing and other features and advantages of the disclosed technology will become more apparent from the following detailed description, which proceeds with reference to the accompanying figures.

DETAILED DESCRIPTION

Figure 1:
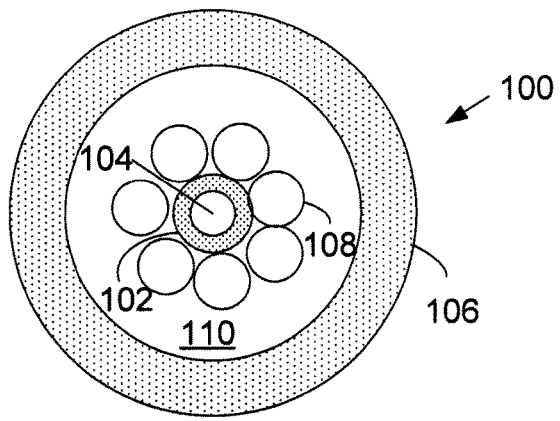
FIG. 1 is a cross-sectional view of a fiber preform that includes a core tube, a cladding tube, and a plurality of capillary tubes situated between the core tube and the cladding tube.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

Optical fibers or other optical waveguides are generally based on a variation of refractive index as a function of distance from a propagation axis. Such refractive index variations include so-called index steps such as those associated with typical step index fibers and continuous variations such as those associated with typical gradient index fibers. Many convenient examples are based on optical fibers having circular cross-sections. Such fibers generally include a central core that is surrounded by a cladding region and the core and cladding are selected to provide guided wave propagation. In the examples disclosed below, optical fibers, optical fiber sections, preforms, and waveguide devices are shown as extending along linear axes. It will be appreciated that fibers and preforms can be arranged on curved, segmented, or axes of other configurations. Typically, such devices extend along propagation axes along which optical radiation propagates in the device, and such axes can be linear or curved.

In some examples, multimode or single mode devices are described, but by suitable selection of device characteristics such as core and cladding refractive indices (or refractive index difference) and dimensions, multimode or single mode devices can be fabricated. To obtain single mode propagation, fiber characteristics are selected so that the so-called V-number $V=\pi NA d_{CORE}/\lambda$ is less than about 2.4, wherein $\lambda$ is a free space wavelength of radiation to be propagated in the device, $d_{CORE}$ is a core diameter, and NA is a device numerical aperture. Device mode field diameters (MFD) can also be selected based on device characteristics, as $MFD=d_{CORE}(0.65+1.619/V^{3/2}+2.879/V^6)$. These relationships are suitable for fiber devices having circular cross-sections, but similar considerations are applicable for other cross-sectional shapes. While considerable variation in fiber dimensions is possible, in typical examples, single mode fibers for use at wavelengths between about 500 nm and 1500 nm have core diameters of between about 3 μm and 20 μm, while multimode fibers have core diameters of between about 10 μm and 500 μm. Propagation characteristics can be based on step index or gradient index designs. For convenient illustration, sectional views of fibers and preforms are provided. While in many useful examples, fiber and preform cross-sections are circular, oval, elliptical, polygonal or other cross-sections can be used. In addition, in some examples, stress rods or other core features can be provided.

The disclosed examples generally pertain to fibers that have a single core surrounded by a cladding layer. However, in other examples so-called double clad fibers can be formed. Double clad fibers generally include a core surrounded by an inner cladding which is in turn surrounded by an outer cladding. Refractive indices and refractive index profiles for these layers can be selected to provide selected waveguide characteristics. In some examples, double clad fibers include an actively doped core that can be configured to support single mode propagation. The active core and the inner cladding can serve to guide pump radiation into the active gain element of the core. Typically the core has a higher refractive index that the inner cladding, and the inner cladding has higher refractive index than the outer cladding. In double clad fibers with actively doped cores, the core and inner cladding can be decentered with respect to each other so as to more efficiently couple pump radiation from the inner cladding into the core, but other configurations of inner clad and core can be used. Other fiber types and associated preforms can be made in the same manner, including polarization retaining fibers that generally include stress elements situated in a cladding layer so as to produce birefringence.

Representative fiber preforms, core rods, tapered core rods, and other components for fiber preforms and fibers, and optical fibers based on such preforms are described below. Preforms can be made by modified chemical vapor deposition (MCVD) or other processes. Typically, a mixture of oxygen, silicon tetrachloride (SiCl4) and materials such as germanium tetrachloride (GeCl4) or rare earth dopants are introduced into a silica glass tube, which is rotated while heated to about 1500-1600 C with a torch. An inner surface of the glass tube is coated, and a layer with higher refractive index is formed which can be drawn into a fiber core. Typically, the glass tube is collapsed by further heating to form a core rod. Other deposition methods such outside vapor deposition (OVD), direct nanoparticle deposition, or others can also be used as well.

Representative methods for producing tapered core optical fibers or waveguides can be based on manipulation of fiber properties during fiber drawing using varied draw speeds applied to a drawn fiber or feed rates applied to one or more preform structures such as sleeving tubes, cladding tubes, core tubes, or capillary tubes. As used herein, a feed rate is associated with the speed of a fiber preform supplied to or in a drawing furnace, and draw speed is a speed of the drawn fiber. A ratio of feed rate and draw speed can be used to define fiber thickness In typical examples of such methods, a fiber preform or other assembly from which a fiber is to be drawn is initially untapered, and taper is developed during drawing. In other representative methods, a preform is based on a tapered core rod that can be fabricated by a machining, grinding, etching, or other process. In some examples, a tapered core rod is processed so as to have a substantially constant cross-sectional shape with an internally varying core. Preforms with tapered cores are typically drawn so that taper lengths in the tapered core are extended by factors of 100-2000. For example, a core rod having a 5 mm length can be drawn into a fiber having a length of about 5 m. As disclosed herein, multiple tapers can be provided in a single preform, and separated after perform is drawn into a fiber.

In some examples, a tapered core is situated within a sleeving tube that is filled or packed with silica grains, or grains of other glassy materials. The grains can be packed, dried, and degassed prior to fiber drawing in which the sleeving tube and the grains are fused onto the core rod. The locations of the beginning and end of a taper in a fiber may not be apparent, but tapers doped with a fluorescent gain species can be viewed directly based on fluorescence emitted in response to pump radiation applied to the core. For example, fluorescence can be observed in a direction perpendicular to a fiber axis. In some cases, a plurality of sleeving tubes can be used.

Fibers can include tapered cores with claddings that have a constant cladding diameter. In general, core tapers can be provided without a corresponding taper in a fiber exterior surface such as a cladding surface, and dimensions and shapes of a fiber exterior can be selected independently of core taper. In the examples provided below, tapered cores in fibers having generally circular cross-sectional areas are described for convenient illustration and because they tend to be suitable for a wide variety of applications. However, similar tapered cores can be provided in fibers of other cross-sectional areas.

Core rods can be formed using direct nanoparticle deposition, and placed within a sleeve that is collapsed onto the core rod. A sleeved core rod is more robust that an unsleeved core rod, and the sleeved rod can be tapered by drawing, grinding, etching, or other processes for inclusion in a fiber preform. MCVD or other processes can also be used.

In some examples, optical fibers comprise a core that extends along a propagation axis and a cladding that surrounds the core and extends along the propagation axis. The core and cladding have respective cross-sectional areas $A_{CORE}$, $A_{CLAD}$, and a ratio $A_{CORE}/A_{CLAD}$ of these cross-sectional areas is a function of position z along the propagation axis so that $A_{CORE}/A_{CLAD}=f(z)$, wherein f(z) is not a constant. In other examples, fibers include a core, an inner cladding, and an outer cladding that are all configured to propagate optical radiation. The ratio functions or the variation in the cross-sectional areas or core or clad effective diameters can correspond to linear or nonlinear functions, trigonometric functions, periodic functions, polynomial functions, step functions, or other functions. In representative embodiments, the cladding has a constant cross-sectional area or diameter. In other embodiments, the core is doped with a rare earth element. In further embodiments, the core is tapered along the axis and the core and the cladding have circular cross-sectional areas.

In some examples, core or cladding cross-sectional areas or radii vary sinusoidally or otherwise at a fixed spatial frequency, and in other examples, periodic variation scans include a plurality of variations with different periods, such as a chirped spatial frequency that increases or decreases along the propagation axis. Such variations are referred to herein as quasi-periodic.

Preforms for forming optical fibers comprise a core having a core cross-sectional area and extending along a preform axis. A cladding has a cladding cross-sectional area and extends along the preform axis, wherein a ratio of the core and cladding cross-sectional areas varies along the preform axis. In some examples, at least one of the preform core and the preform cladding is doped so that a preform core refractive index is greater than a preform cladding refractive index. In other examples, the preform core and the preform cladding have substantially circular cross-sectional areas.

Example 1

A sectional view of a fiber preform 100 is illustrated in FIG. 1. The preform 100 includes a core tube 102 having an interior void 104. The core tube 102 is typically doped with at least one active laser species such as Nd or other rare earth element, or other suitable laser dopant. The core tube 102 is surrounded by a cladding tube 106, and one or more capillary tubes such as representative capillary tube 108 are situated in a space 110 between the cladding tube 106 and the core tube 102. The core tube 102 and the cladding tube 106 generally are situated so as to extend along a central axis for ease in drawing the fiber preform 100 into a fiber. The diameter and wall thickness of the cladding tube 106 and dimensions and dopings of the core tube 102 are generally selected based on intended fiber characteristics such as core diameter, cladding diameter, and core doping density and doping density profile in the core. The capillary tubes such as the capillary tube 108 may also contribute to cladding thickness, but these capillary tubes can be selected to have sufficiently low wall thicknesses so as to make only a limited contribution to the fiber cladding.

Example 2

Figure 2:
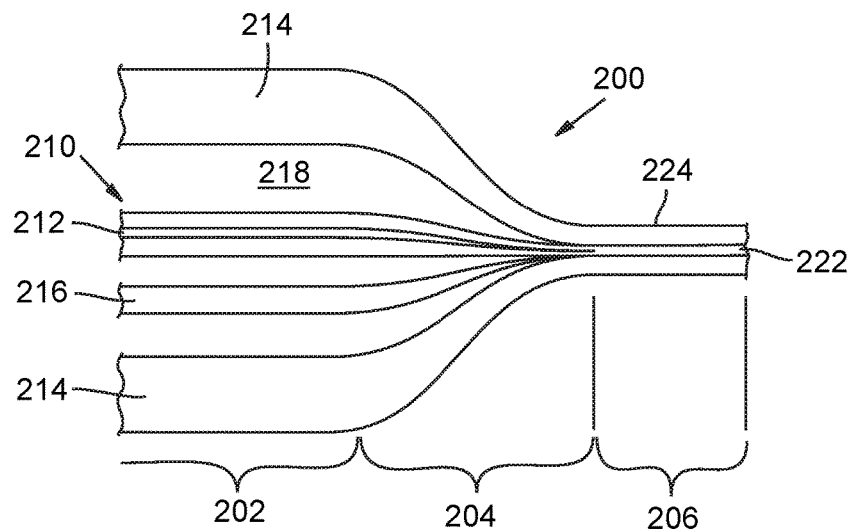
FIG. 2 illustrates processing of a preform similar to that shown in FIG. 1.

FIG. 2 illustrates a fiber preform 200 such as that shown in FIG. 1 having an unprocessed portion 202, a tapered portion 204, and an optical fiber portion 206. The preform includes a core tube 210 having a central void 212, and a cladding tube 214. One or more capillary tubes such as representative capillary tube 216 are situated in cavity 218 defined by the core tube 210 and the cladding tube 214. In the tapered portion 204, the core tube 210, the capillary tube 216, and the cladding tube 214 taper to as to have smaller diameters, with the cladding tube 214 and the capillary tube 216 collapsing on the core tube 210. The optical fiber portion 206 includes a fiber core 222 defined by the core tube 210 and a fiber cladding 224 defined by the cladding tube 224, with some contribution from the collapsed capillary tube 216. Characteristics of the fiber portion 206 can be determined by selection of core tube and cladding tube materials, dimensions, and dopings as well as pressures applied to the interiors of the core tube 210, the cladding tube 214, and the capillary tube 216. For example, the fiber core 222 can be tapered.

Example 3

Figure 3:
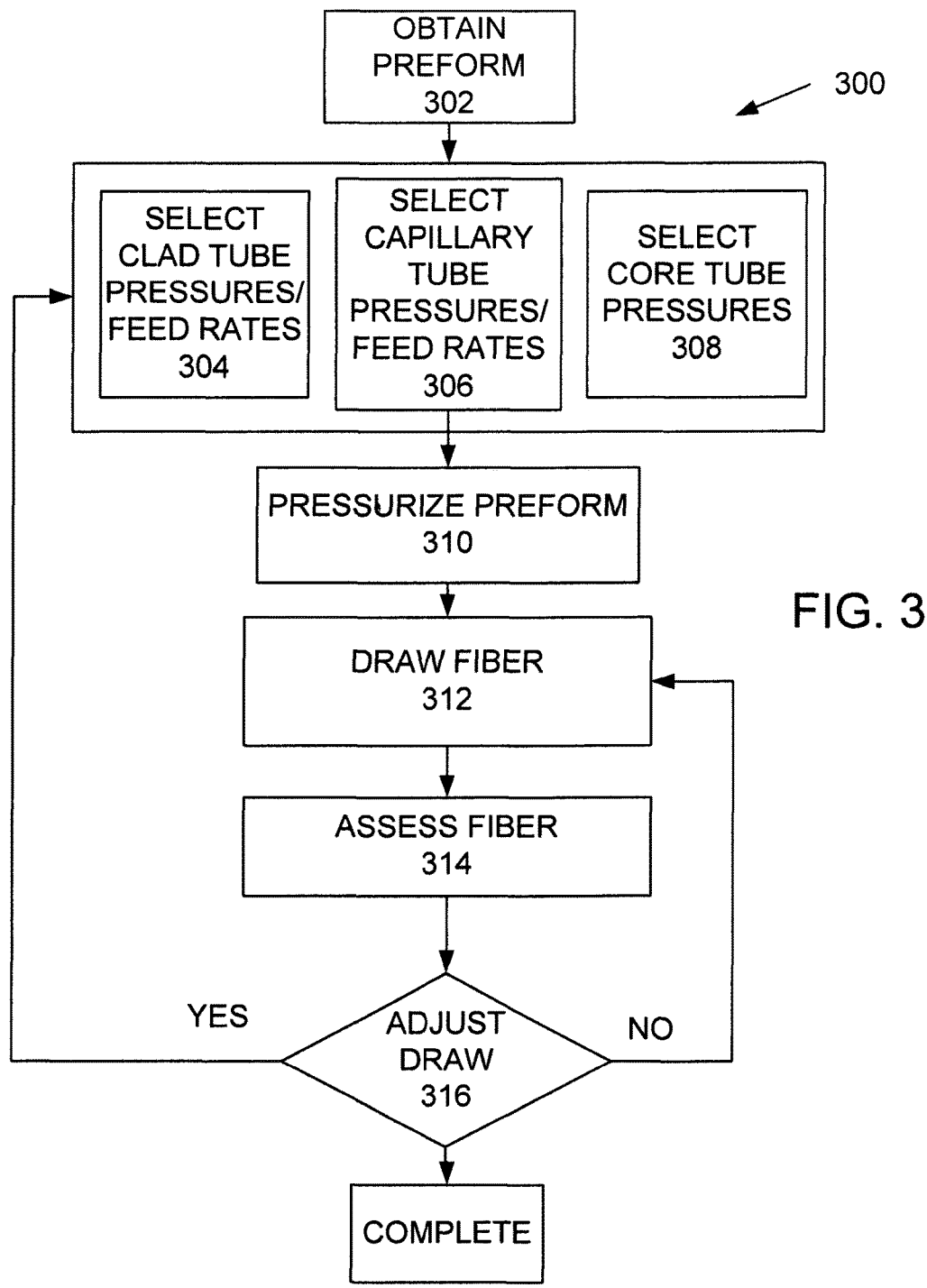
FIG. 3 is schematic block diagram of a representative method of making a tapered core optical fiber.

Fiber preforms containing either core rods with voids, core tubes, or capillary tubes situated between a core rod and a cladding tube as shown in FIGS. 1-2 can be processed to form variably tapered fibers based on pressures coupled to the interiors of capillary tubes and/or pressures coupled to a void in a core rod, in addition to feed rate differences between the parts. In some examples, application of a pressure to a core rod or a cladding tube can be used to provide a selected feed rate. Fiber draw parameters such as draw speed and temperature can also be selected independently or in conjunction with applied pressures and feed rates. FIG. 3 illustrates a representative method 300 that includes obtaining a fiber preform at 302, wherein the fiber preform typically includes a cladding tube that contains a core rod or tube, and one or more capillary tubes. A first pressure and feed rate to be provided to a volume defined by a cladding rod interior surface is selected at 304. A second pressure and feed rate is selected for application to one or more volumes corresponding to capillary tube interiors at 306, wherein the capillary tubes are situated within the volume defined by the cladding rod interior surface. A third pressure can be selected for application to a volume corresponding to a void in the core tube at 308. These pressures and feed rates are generally selected to be time-varying during a fiber drawing process so that one or both of a core or cladding diameter can be varied, and adjustments to fiber drawing can be made during processing. Typically, core tube feed rate can be controlled or selected based on core tube pressure, and clad tube feed rate can be based on clad tube pressure. At 310, the selected preform is pressurized according to the selected pressures, and fiber drawing is performed at 312. At 314, the drawn fiber is assessed based on core diameter, cladding diameter, taper extent, taper rate, or other characteristics so that one or more of the pressures and/or other draw parameters can be changed appropriately. At 316, if adjustment of fiber draw parameters is needed, parameters such as pressures and feed rates can be re-selected at 304, 306, 308, or other process parameters such as draw rate, draw temperature, and tension can be adjusted.

While first, second, and third pressures can be selected, in some examples, pressure differences are selected. For example, a core tube/cladding tube pressure difference can be selected, and a capillary tube pressure can be selected based on the core tube or cladding tube pressures. Pressures or pressure differences can be based on application of an inert gas such as helium, or other suitable gas, or one or more volumes can be evacuated or partially evacuated. By varying pressures and pressure differences together with the feed rates, core or cladding diameters can be adjusted. For example, increasing a pressure applied to the interior of the core tube tends to increase core diameter so that by increasing and decreasing core tube pressures, a variably tapered core can be produced. Cladding diameter can also be varied by control of applied pressures, or cladding diameter can be held substantially constant while a core is tapered by suitable pressure adjustments. In other examples, feed rates can be changed during drawing to vary core area, and cladding diameter can be constant or varied as well.

Example 4

Figure 4A:
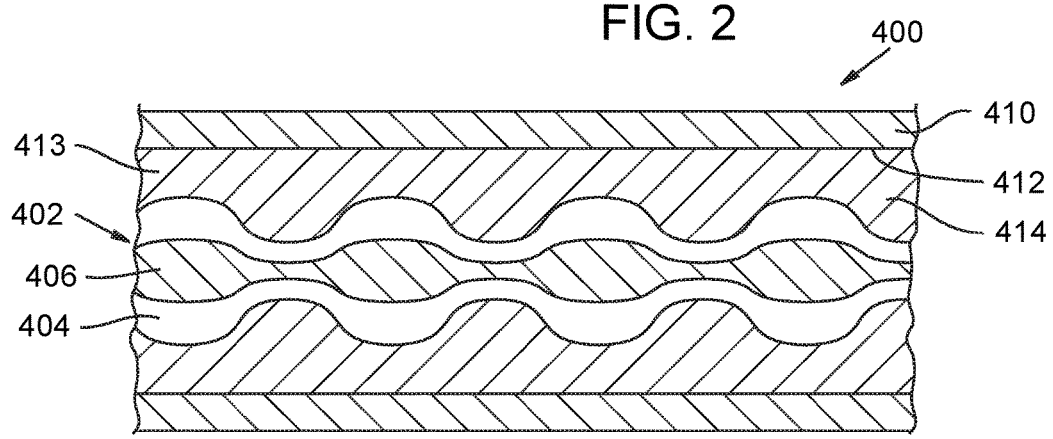
FIGS. 4A-4B illustrate fiber preforms for fabricating tapered core optical fibers.
Figure 4B:
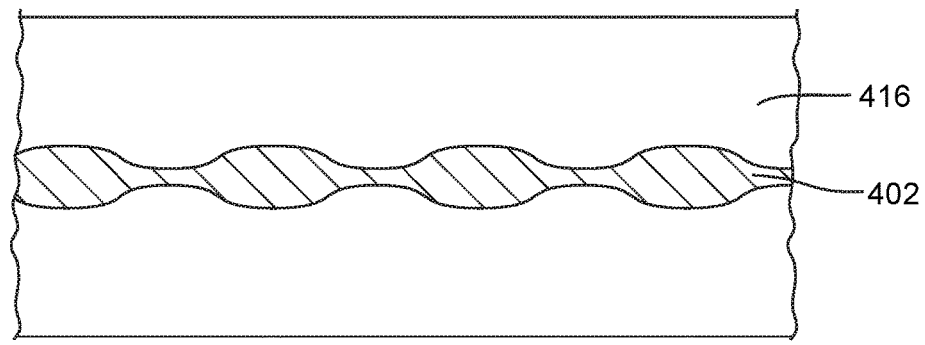

A portion 400 of an alternative preform for forming fibers with tapered cores is illustrated in FIG. 4A prior to a sintering process. The preform 400 includes a core rod 402 having a doped central region 406 and an undoped outer portion 404. In some examples, one or both of the regions are undoped, have different dopings, or have the same dopings. Dopants can be provided to provide suitable refractive index differences to establish preferred optical mode characteristics, or gain species such as rare earth elements can be introduced to provide optical signal amplification. The tapering of the core rod 402 can be provided by heating in a $O_2$—$H_2$ flame or other heat source and applying a varying longitudinal tension. The core rod 402 is situated within a cladding tube 410, and a volume 413 between an interior wall 412 of the cladding tube 410 and the core rod 402 is partially or completely filled with a $SiO_2$ grains or other glass or glassy material. The preform 400 can be processed so that the $SiO_2$ grains are sintered and a glass tube 416 is formed around the core rod 402 as shown in FIG. 4B.

The grains or other glassy material can be sintered in a fiber draw tower, and processed from bottom up to collapse the cladding tube so that the grains are retained between the core rod and the cladding tube. In this way, the grains are held in place during fiber drawing. Small grains tend to produce fewer bubbles but may be difficult to use if vacuum pumping around grains is desired as some grains may cause pump damage. In the above examples, silica grains or other glassy materials are used as fillers, but in other examples, sol-gel materials can be used.

Example 5

Figure 5:
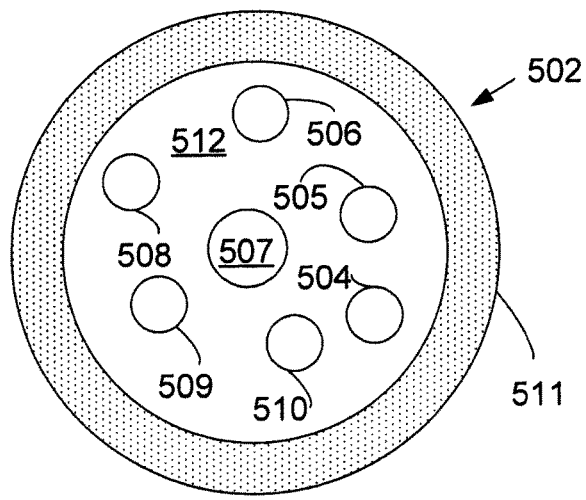
FIG. 5 is a cross-sectional view of a core rod preform.

In an alternative example illustrated in FIG. 5, a core rod preform 502 is formed by situating one or more silica tubes 504-510 in a larger silica tube 511. A space 512 exterior to the silica tubes 504-510 is filled or partially filled with silica granules or other glassy material. The silica tubes 504-510 can be filled with silica granules and a predetermined concentration of a rare earth oxide and aluminum oxide. Concentrations can be selected to provide suitable refractive indices, optical gain, or for other purposes. A core rod is formed from the core rod preform 502 by drawing at a temperature of 1500-2200° C. with a variable longitudinal tension or draw rate so that the core rod has a variable taper. In some examples, only a single silica tube is provided and is at least partially filled with a rare earth/aluminum oxide mixture. The resulting core rod can be situated at a center of a second silica tube 507 and undoped silica used to fill or partially fill a volume defined by the second silica tube and the core rod to form a secondary preform. The secondary preform is then preheated and evacuated, and then drawn into a fiber. In some examples, the core rod is situated in a silica tube having a diameter of between 17 mm and 21 mm, and the fiber has a diameter between about 50 μm and 2 mm, and fiber core diameter is between about 5 μm and 20 μm. In the above examples, silica grains or other glassy materials are used as fillers, but in other examples, sol-gel materials can be used.

Example 6

Figure 6A:
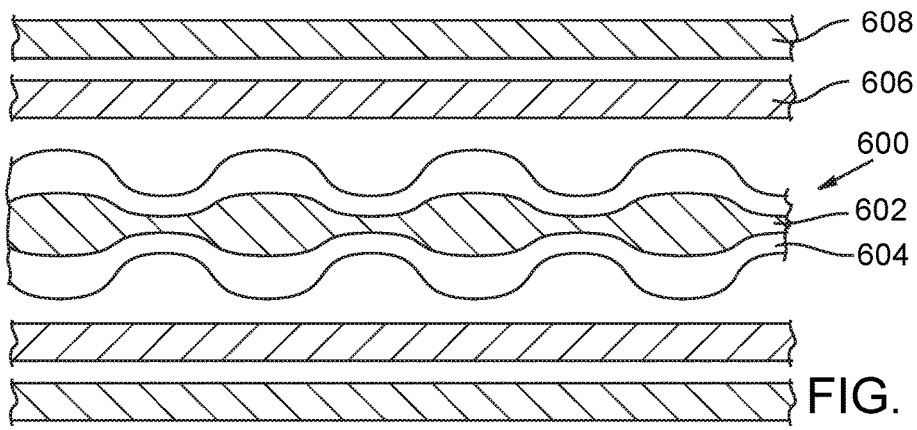
FIGS. 6A-6B illustrate fiber preforms configured to produce a varying core diameter and a constant cladding diameter.

With reference to FIG. 6A, a tapered core rod 600 includes a central tapered region 602 contained within a perimeter cladding layer 604. The tapered core rod 600 can be formed by heating an untapered core rod with an $O_2$—$H_2$ flame or other heat source and drawing the core rod. The central tapered region 602 can include one or more dopants to provide an increased refractive index with respect to the perimeter cladding layer 604 to define guided optical modes, and/or to produce optical gain in response to pumping by a pump source such as one or more laser diodes. One or more sleeving tubes such as representative sleeving tubes 606, 608 can be situated about the core rod 600 and collapsed onto the core rod 600 to become a fiber preform by heating.

Figure 6B:
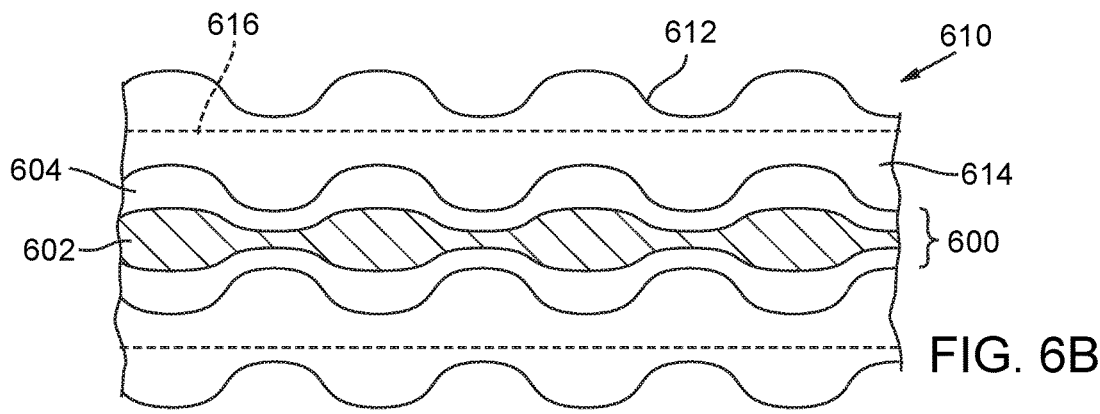

FIG. 6B illustrates a preform 610 obtained by collapse of the sleeving tubes 606, 608 onto the core rod 600 as shown in FIG. 6A. The core rod 600 is situated within collapsed sleeving 614. Due to the varying diameter of the core rod 600, an exterior surface 612 of the preform 610 has a corresponding tapered or otherwise varying shape. Variation in the diameter of the preform 610 and the shape of the surface 612 typically depends on the taper of the core rod 600 and the number and dimensions of the sleeving tubes. The exterior surface 612 can be shaped to provide a round, polygonal, or other cross-section. For example, the preform 610 can be ground to a so as to have a circular cross-section defined by a grinding surface 616. The resulting preform can be processed into an optical fiber with a conventional drawing process to produce optical fibers having tapered cores and constant cladding diameters.

The tapered core rod 600 can have slightly elliptical or other non-circular cross-sections, and collapse of sleeving tubes can be associated with bubbles between the collapsed sleeving tubes 606, 608 and the core rod 600. Bubbles tend to be less likely with thin walled sleeving tubes and sleeving tubes with low melting temperatures. In addition, bubble formation can be reduced using sleeving tubes selected so that gaps between sleeving tubes and the core rod 600 are controlled to limit gap size.

Example 7

Figure 7A:
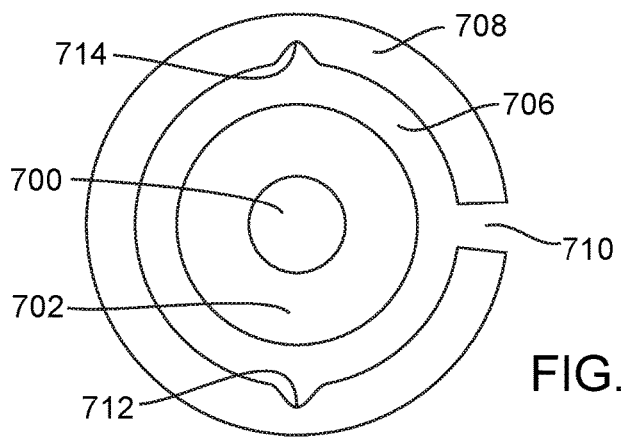
FIG. 7A is a sectional view of a representative arrangement for a fiber preform that includes a tapered core.

With reference to the sectional view of FIG. 7A, a fiber preform can be formed with a tapered core rod 702 and a sleeving tube 708 that define an interior volume 706. The tapered core rod 702 can include a central doped region 700 that can be provided with an active dopant to produce optical gain, or a dopant selected to provide an intended refractive index. The sleeving tube 708 can include one or more apertures such as aperture 710 that can permit evacuation of the interior volume 706. The aperture 710 can be circular, elliptical, polygonal or other shape, and a plurality of such apertures can be provided along a length of the sleeving tube 708. In other examples, the aperture 710 can be provided as a periodic or aperiodic series of slits extending parallel to a preform axis. In another alternative, the sleeving tube 708 can have two parts that are situated so as to define the aperture 710 as a gap between the parts, or a single sleeving tube can have a longitudinally extending slit. Such slits and apertures can permit gases trapped between the sleeving tube 708 and the tapered core 702 to exit as the sleeving tube 708 is collapsed, thereby reducing the likelihood of bubble formation. Bubbles can also be reduced by filling any volumes of concern with helium gas. In another example, longitudinally extending cavities such as cavities 712, 714 can be provided, and permit trapped gases to be removed as well. In some examples, such cavities are coupled to a vacuum system. In other examples, slits, apertures, or cavities may be situated at one or more locations about the sleeving tube as convenient, and can be symmetrically or asymmetrically placed.

Example 8

Figure 7B:
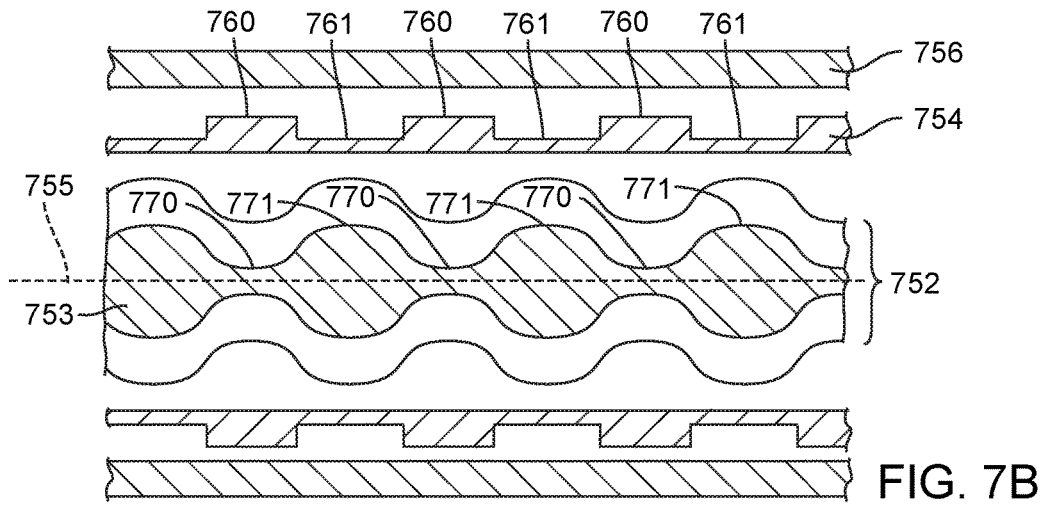
FIG. 7B illustrates a sleeving tube having notches and protrusions on an exterior wall.

With reference to FIG. 7B, a representative multi-part preform includes a tapered core rod 752 having a tapered core 753 (typically rare earth doped), and an inner sleeving tube 754 that are situated along an axis 755. A second sleeving tube 756 is situated about the tapered core rod 752 along the axis 755 to be collapsed onto the tapered core rod 752. The inner sleeving tube 754 includes alternating protrusions 760 and notches 760 that can be aligned with respect to the tapered rod 752 so that the protrusions are situated at narrower portions or "necks" 770 of the tapered core rod 752 and the notches 761 are situated at relatively wider portions 771 of the tapered core rod 752. Dimensions of the protrusions and notches can be selected to at least partially compensate taper so that after the sleeving tube 754 is collapsed onto the tapered core rod 752, diameter variations tend to be reduced. In other examples, the sleeving tube 754 can be situated so as to increase diameter variations.

Example 9

Figure 8:
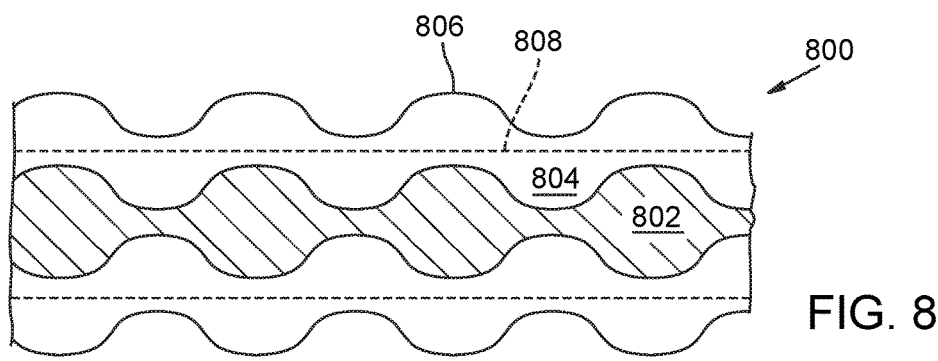
FIG. 8 illustrates a tapered core rod illustrating reduction of an exterior taper by grinding.

In another example, a tapered core rod can be ground or otherwise processed to have a substantially constant, untapered exterior surface. Referring to FIG. 8, a tapered core rod 800 includes a tapered core 802 and an overcladding 804 having an exterior surface 806 whose shape is indicative of the taper of the tapered core 802. A trim line 808 indicates portions of the tapered core rod 800 that can be removed by grinding or other process to produce a preform with an untapered exterior, typically a cylindrical exterior. However, the exterior surface can be ground, polished, or otherwise processed to produce a rectangular, elliptical, polygonal, or other cross-section. Such a preform can then be drawn to produce a tapered core fiber with a substantially constant outside diameter. Typically, such a ground core rod is provided with one or more sleeves that are collapsed to produce a preform. The untapered exterior surface of the core rod tends to reduce bubble formation as the sleeving tubes are collapsed.

Example 10

In other examples, a tapered core rod can be processed to remove or reduce an exterior taper using an etching process.

Figure 9:
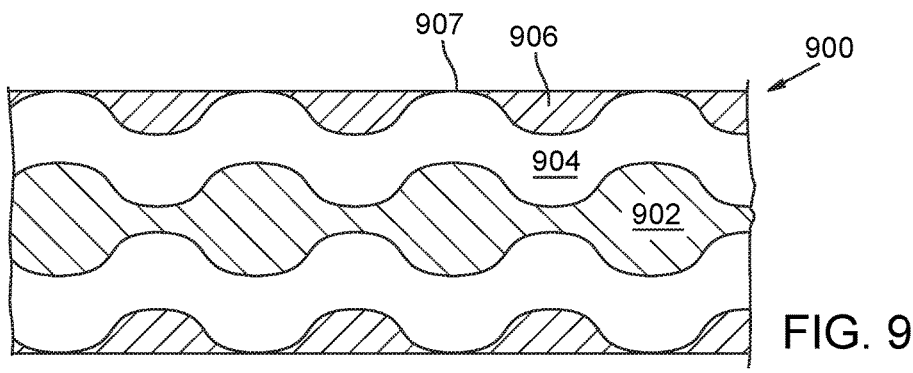
FIG. 9 illustrates a tapered core rod having a resist layer applied for reduction of an exterior taper by etching.

Referring to FIG. 9, a tapered core rod 900 includes a tapered core 902 and a tapered overcladding 904. To reduce taper of an exterior surface 907 of the tapered core rod 900, resist such as a photoresist is applied at smaller diameter portions of the tapered core rod 900, and the tapered rod 900 is exposed to an etchant such as an HF solution. Photoresist can be applied and patterned by coating the exterior surface 907 and then rotating the coated tapered rod with a suitable pattern situated between the tapered coated rod and an exposing light source. In other examples, the surface 907 can be covered with a protective film such as a polytetrafluoroethylene tape, or tape of other relatively unreactive material. After etching, the core rod can be untapered or only slightly tapered, and can be sleeved to build up a suitable preform.

Example 11

Preform, core, cladding, and other dimensions can be selected based on characteristics of a fiber to be produced. In typical examples, fibers having core/cladding diameters ranging from 2 µm/400 µm to 60 µm/1000 µm are formed. In some examples, a core rod has a length of 10-100 mm, and a diameter of between 5 mm and 25 mm. An untapered core rod can be elongated from about 50 mm to about 500 mm, with typical core diameters of 1-5 mm and overclad diameters of between 2 mm and 10 mm. In a typical example, a tapered core rod has minimum diameter of about 2.2 mm, a total length of about 5.8 mm, and can be used to produce a fiber about 5 m long. Tapered cores in a core rod are typically periodically tapered with a period of between 1 mm and 20 mm and taper periods in drawn fibers can range from about 10 mm to 50 m. Sleeving tubes of various dimensions (diameters, wall thickness) can be used. For example, a sleeving tube having a 6.5 mm inside diameter and a 19.6 mm outside diameter can be used. In typical examples, tapered core rods are sleeved with silica tubes of inner diameters between 5 mm and 15 mm, and exterior diameters of 10 mm to 25 mm.

In a particular example, a 25 mm long core rod with a core having a 5 mm diameter and an overclad having a diameter of 15 mm is situated in a sleeve and elongated to be about 200 mm long and the core and overclad have diameters of 1.75 mm and 5.3 mm, respectively. The core rod is tapered to form tapers having a minimum diameter of 2.2 mm and a length of 5.8 mm. In one example, such a tapered core rod is sleeved with a tube having a 6.5 mm inside diameter and a 19.6 mm outside diameter, and drawn to a 5 m long fiber. In other examples, the sleeve is collapsed on the tapered core rod, and ground or etched to form a substantially untapered rod of length of about 200 mm, and an outside diameter of about 13 mm. The untapered rod can be re-sleeved with additional sleeving tubes to increase preform and fiber diameters.

Example 12

The examples disclosed above are representative, and are selected for convenient illustration, and many other examples can be provided. For example, preforms and fibers having oval, elliptical, polygonal (such as hexagonal and octagonal) cross sections can be provided. While doped cores are convenient for forming optical waveguides, claddings can be doped as well to provide suitable refractive index profiles, or both cores and claddings doped. In most guided wave examples, the core and cladding are doped or otherwise configured so that a refractive index in the core is larger than a cladding refractive index. In some examples, the core and/or the cladding are actively doped with one or more active materials so as to form lasers, or optical amplifiers. For example, rare-earth elements such as erbium, ytterbium, neodymium, dysprosium, praseodymium, and thulium can be included. However, other configurations are possible. Sensitizing agents to promote pumping can also be added, and stress rods or other features associated with polarization maintaining waveguides can be provided.

Example 13

Figure 10:
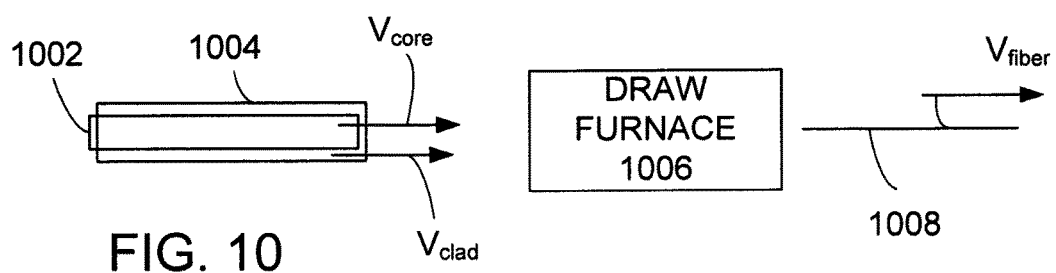
FIG. 10 is a schematic diagram illustrating formation of a tapered fiber by varying a feed rate of a core tube or rod and a feed rate of a cladding tube.

With reference to FIG. 10, a representative method of fiber manufacture includes directing a core rod, core tube, or other core precursor 1002 situated within one or more sleeving tubes such as the sleeving tube 1004 to a draw furnace 1006. The core precursor 1002 and the sleeving tube 1004 can be fed to the draw furnace 1006 at feed rates Vcore, Vclad, respectively. These feed rates can be varied during drawing and a difference between these feed rates can be constant or time varying. After fusing in the draw furnace 1006, the fused core precursor/sleeving tube form a fiber 1008 that exits the draw furnace at a draw speed $V_{fiber}$. By selecting different feed rates for the core precursor 1002 and the sleeving tube 1004, the fiber 1008 can be provided with a constant or variable taper. In some examples, the feed rates can be determined based on pressures applied to one or more of the core precursor 1002 and the sleeving tube 1004, or volumes within the core precursor 1002 or the sleeving tube 1004.

Having described and illustrated the principles of the disclosed technology with reference to the illustrated embodiments, it will be recognized that the illustrated embodiments can be modified in arrangement and detail without departing from such principles. We claim all that is encompassed by the appended claims.

We claim:
1. A method, comprising:
situating a core tube within a cladding tube;
selecting:
   a first feed rate for the core tube and a second feed rate for the cladding tube, and
   a first pressure to be applied to a volume defined by a core tube interior, wherein the first pressure is applied independently of the first feed rate and the second feed rate; and
drawing the core tube and the cladding tube so as to form an optical fiber, wherein:
   at least one of the first feed rate, the second feed rate or the first pressure is selected so that the core tube and cladding are drawn so that the optical fiber has a tapered core;
   the selected first pressure is a time-varying pressure that is applied to the core tube interior during the drawing; and
   at least one of a fiber core diameter and a fiber cladding diameter is at least partially determined by the first feed rate, the second feed rate, or the first pressure.
2. The method of claim 1, further comprising varying at least the first feed rate or the second feed rate during the drawing.
3. The method of claim 1, further comprising situating at least one capillary tube within the cladding tube, and drawing the core tube, the capillary tube, and the cladding tube to produce the optical fiber.

4. The method of claim 3, further comprising applying a second pressure to an interior volume of the capillary tube so that the optical fiber has a tapered core and a constant cladding diameter.

5. The method of claim 3, further comprising at least partially filling the cladding tube interior with silica grains, and fusing the silica grains as the core tube, the capillary tube, and the cladding tube are drawn to form the optical fiber.

6. The method of claim 1, wherein the first pressure is applied by application of an inert gas.

7. The method of claim 1, wherein the time-varying pressure is varied either by applying an inert gas to or by evacuating the core tube interior.

8. A method, comprising:
   situating a core tube within a cladding tube;
   selecting:
      a first feed rate for the core tube and a second feed rate for the cladding tube, and
      a first pressure to be applied to a volume defined by a cladding tube interior, wherein the first pressure is applied independently of the first feed rate and the second feed rate;
   drawing the core tube and the cladding tube so as to form an optical fiber, wherein at least one of a fiber core diameter and a fiber cladding diameter is at least partially determined by the first feed rate, the second feed rate, or the first pressure;
   situating at least one capillary tube within the cladding tube, and drawing the core tube, the capillary tube, and the cladding tube to produce the optical fiber;
   applying a second pressure to an interior volume of the capillary tube so that the optical fiber has a tapered core and a constant cladding diameter; and
   applying a third pressure to a volume defined by a core tube interior.

9. The method of claim 8, wherein at least two of the first pressure, the second pressure, and the third pressure are different.

10. The method of claim 9, wherein the first pressure, the second pressure, and the third pressure are different from one another.

* * * * *